US012798086B2

(12) United States Patent
Hwang et al.

(10) Patent No.: US 12,798,086 B2
(45) Date of Patent: Nov. 17, 2026

(54) GRIPPER APPARATUS FOR VEHICLE

(71) Applicants: Hyundai Motor Company, Seoul (KR); Kia Corporation, Seoul (KR)

(72) Inventors: Jin Ho Hwang, Cheonan-si (KR); Sang Ah Ko, Seoul (KR); Sang Heon Lee, Seoul (KR); Choon Taik Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 256 days.

(21) Appl. No.: 18/676,788

(22) Filed: May 29, 2024

(65) Prior Publication Data

US 2025/0205880 A1 Jun. 26, 2025

(30) Foreign Application Priority Data

Dec. 26, 2023 (KR) ........................ 10-2023-0191360

(51) Int. Cl.

*B25J 15/00* (2006.01)
*A61G 5/06* (2006.01)
*B25J 9/16* (2006.01)
*B25J 13/08* (2006.01)
*B25J 15/02* (2006.01)

(52) U.S. Cl.

CPC .............. *B25J 9/1615* (2013.01); *A61G 5/06* (2013.01); *B25J 9/1612* (2013.01); *B25J 13/086* (2013.01); *B25J 15/0028* (2013.01); *B25J 15/0246* (2013.01); *A61G 2203/40* (2013.01)

(58) Field of Classification Search

CPC ...... A61G 3/0808; A61G 3/0833; A61G 5/06; A61G 2203/40; A61G 2203/78; A61G 2220/14; B25J 9/1612; B25J 9/1615; B25J 13/086; B25J 15/0028; B25J 15/0246; B60R 11/00; B60R 2011/007; B60R 2011/0042; B60R 2011/0092

USPC ....................................................... 280/288.4

See application file for complete search history.

(56) References Cited

FOREIGN PATENT DOCUMENTS

| | | | | |
|---|---|---|---|---|
| KR | 10-2021-0074044 A | | 6/2021 | |
| WO | WO-2018194577 A1 | * | 10/2018 | ............ A61G 3/062 |

* cited by examiner

*Primary Examiner* — Valentin Neacsu
*Assistant Examiner* — Felicia L. Brittman-Alabi
(74) *Attorney, Agent, or Firm* — Morgan, Lewis & Bockius LLP

(57) ABSTRACT

In a gripper apparatus for a vehicle, an item of a wheelchair loaded into an internal space of a vehicle may be fixed by a fixing structure of the gripper module using magnetic forces generated by a stationary magnet and a rotary magnet so that a wheelchair user may fix the wheelchair without the assistance of another person.

18 Claims, 10 Drawing Sheets

GRIPPER APPARATUS FOR VEHICLE

CROSS-REFERENCE TO RELATED APPLICATION

The present application claims priority to Korean Patent Application No. 10-2023-0191360, filed on Dec. 26, 2023, the entire contents of which is incorporated herein for all purposes by this reference.

BACKGROUND OF THE PRESENT DISCLOSURE

Field of the Present Disclosure

The present disclosure relates to a gripper apparatus for a vehicle, and more particularly, to a technology related to a gripper apparatus for a vehicle, which is capable of fixing an item in an internal space of a vehicle by use of a fixing structure using a magnet.

Description of Related Art

In general, a user, who utilizes a wheelchair because of limited mobility, utilizes a vehicle in a long distance. In the instant case, the wheelchair user travels in a state in which the wheelchair is loaded into an internal space of the vehicle.

In case that the wheelchair is loaded into the internal space of the vehicle, the wheelchair may be fixed by a seat belt.

In case that the seat belt is used to fix the wheelchair, the assistance of another person is required to fasten the seat belt, and the task of fastening the seat belt is difficult and complicated. Accordingly, there is a concern that the wheelchair moves inadvertently because the seat belt is loosened even after the wheelchair is fixed.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a gripper apparatus configured for fixing an item (wheelchair), which is loaded into an internal space of a vehicle, by use of a fixing structure using a magnet, in which the gripper apparatus may be conveniently used without the assistance of another person, increase a fixing force for fixing the item (wheelchair) by use of a magnetic force, and further improve the safety.

To achieve the above-mentioned object, the present disclosure provides a gripper apparatus for a vehicle, the gripper apparatus including: a gripper module positioned in an internal space of the vehicle into which an item is loaded, the gripper module being configured to fix the item loaded into the internal space; and a link module connected to the gripper module and configured to rectilinearly move the gripper module while rotating.

The item, which is loaded into the internal space of the vehicle and gripped by the gripper module, may be a frame which is made of steel and forms a wheelchair.

The gripper apparatus may further include: a guide module provided to connect the gripper module, the link module, and a vehicle body and configured to guide the rectilinear movement of the gripper module when the link module operates.

The gripper apparatus may further include: a power module connecting the link module and a vehicle body and configured to generate power for rotating the link module.

The gripper module includes: upper and lower pawls spaced from each other in an upward and downward direction thereof; left and right side brackets coupling the upper and lower pawls; an upper pawl extension portion pivotally coupled to an end portion of the upper pawl by an upper hinge and configured to be rotatable upward or downward; a lower pawl extension portion pivotally coupled to an end portion of the lower pawl by a lower hinge and configured to be rotatable upward or downward; a stationary magnet fixed by the upper and lower pawls and including an S-pole and an N-pole that are not changed in position; and a rotary magnet rotatably mounted at one side of the stationary magnet and including an S-pole and an N-pole that vary in position when the rotary magnet rotates.

The gripper module may further include: an upper holder coupled to an end portion of the upper pawl extension portion; and a lower holder coupled to an end portion of the lower pawl extension portion, and the upper and lower holders may prevent the withdrawal of the item inserted into a space formed between the upper pawl extension portion and the lower pawl extension portion when the upper pawl extension portion and the lower pawl extension portion are in a closed state.

The upper pawl, the upper pawl extension portion, the lower pawl, and the lower pawl extension portion may each be made of a magnetic material configured for transmitting magnetic forces generated by the stationary magnet and the rotary magnet, and the left and right side brackets, the upper holder, the lower holder, the upper hinge, the lower hinge, a center hinge may each be made of a non-magnetic material incapable of transmitting a magnetic force.

The gripper module may further include: a center hinge having first and second opposite end portions coupled to flanges of the left and right side brackets; and at least a hinge spring mounted on the center hinge and including first and second opposite end portions supported on the upper pawl extension portion and the lower pawl extension portion, the at least a hinge spring being configured to provide spring forces to the upper pawl extension portion and the lower pawl extension portion so that the upper pawl extension portion and the lower pawl extension portion rotate in opening directions.

The gripper module may further include a gripper motor fixed on one of the left and right side brackets and provided with a motor shaft including an end portion to which the rotary magnet is coupled.

The gripper module may further include: a proximity sensor fixed to a sensor bracket connected to the side bracket, the proximity sensor being configured to detect the item that approaches the gripper module; and a controller operatively connected to the proximity sensor and configured to control an operation of the gripper motor by use of a signal of the proximity sensor.

When the gripper module is in a releasing state, the item may be positioned outside the gripper module, the S-pole and the N-pole of the stationary magnet may respectively face the N-pole and the S-pole of the rotary magnet so that a flow of magnetic force may be formed only between the stationary magnet and the rotary magnet, and the upper pawl extension portion and the lower pawl extension portion may be moved outward away from each other by spring forces of the at least a hinge spring so that the gripper module may be maintained in an open state.

The item gripped by the gripper module may be configured by a magnetic material made of steel, and when the item is introduced into the space between the upper pawl extension portion and the lower pawl extension portion, the gripper motor may operate by being controlled by the controller that receives a signal of the proximity sensor, the S-pole and the N-pole of the stationary magnet may respectively face the S-pole and the N-pole of the rotary magnet by operation of the gripper motor, and a flow of magnetic force may expand to a route that passes through the stationary magnet, the rotary magnet, the upper pawl extension portion, the lower pawl extension portion, and the item so that the upper pawl extension portion and the lower pawl extension portion may rotate in a direction in which the upper pawl extension portion and the lower pawl extension portion are closed so that the upper pawl extension portion and the lower pawl extension portion are in a closed state so that when the upper pawl extension portion and the lower pawl extension portion are in the closed state, the gripper module may be in a gripping state, and the item may be fixed by the closed upper and lower pawl extension portions when the gripper module is in the gripping state so that the upper and lower holders may prevent the item from being withdrawn to the outside thereof.

The guide module may include: a stationary rail provided in the internal space into which the item is loaded, the stationary rail being fixed to a bottom portion of the vehicle body and extending forward and rearward thereof; a movable rail coupled to the stationary rail and configured to move along the stationary rail; and a guide bar coupled to the movable rail and connected to the gripper module and the link module.

The guide module may further include a guide shaft provided between the stationary rail and the movable rail and configured to support a movement of the movable rail and minimize a clearance between the stationary rail and the movable rail.

The power module may include: a base bracket fixed to the vehicle body in the internal space into which the item is loaded; a drive motor fixed to the base bracket, a driving gear connected to the drive motor and rotatably coupled to the base bracket; and a plurality of driven gears engaged to the driving gear and the link module and configured to transmit a rotation force.

The link module may include: first links each including a first end portion coupled to the driven gear; and second links each including one end portion rotatably coupled to the guide bar, an end portion of the first link and an end portion of the second link may be rotatably coupled to each other, the first links may be provided as two first links, the second links may be provided as two second links, the two first links and the two second links may be provided to be vertically symmetric, and when the first and second links are rotated by operation of the drive motor, the guide bar and the gripper modules may rectilinearly move in a direction toward the base bracket and the opposite direction as the movable rail moves along the stationary rail.

According to the gripper apparatus for a vehicle according to an exemplary embodiment of the present disclosure, the item loaded into the internal space of the vehicle may be fixed by the fixing structure of the gripper module using the magnetic forces generated by the stationary magnet and the rotary magnet. Therefore, the wheelchair user may fix the wheelchair without the assistance of another person, the user may conveniently use the gripper apparatus, the fixing force for fixing the item may be increased by the magnetic force, and the safety may be further improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
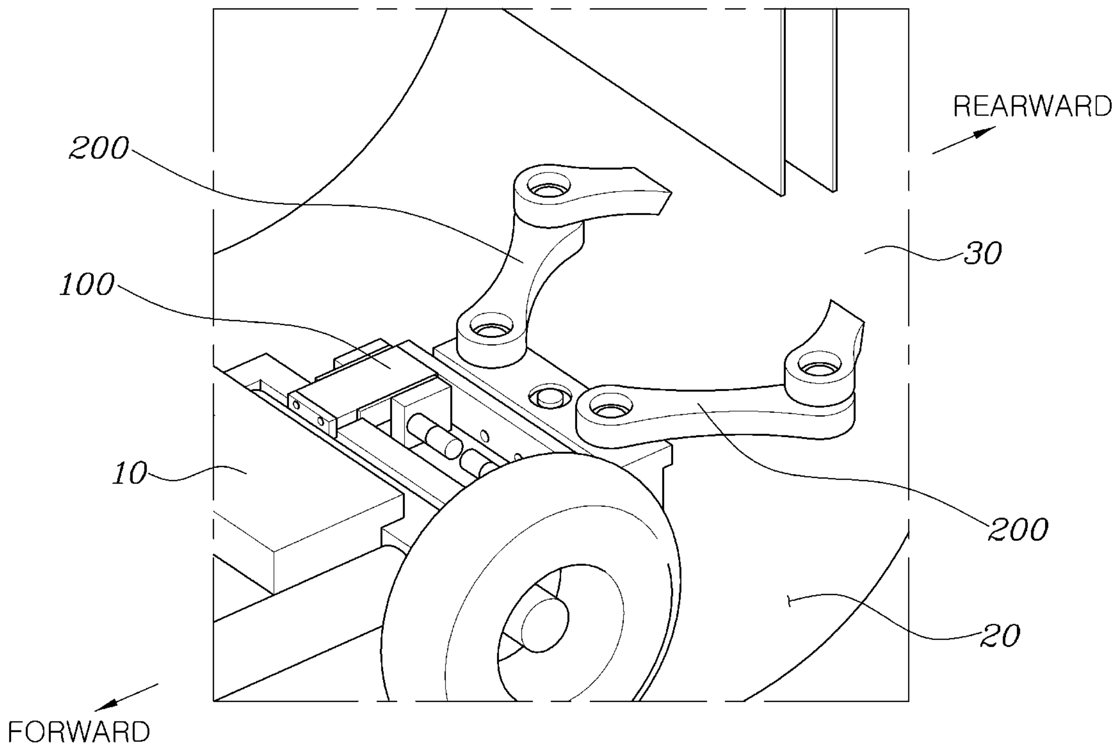
FIG. 1 is a view exemplarily illustrating a state in which a wheelchair is fixed by a gripper apparatus according to an exemplary embodiment of the present disclosure.
Figure 2:
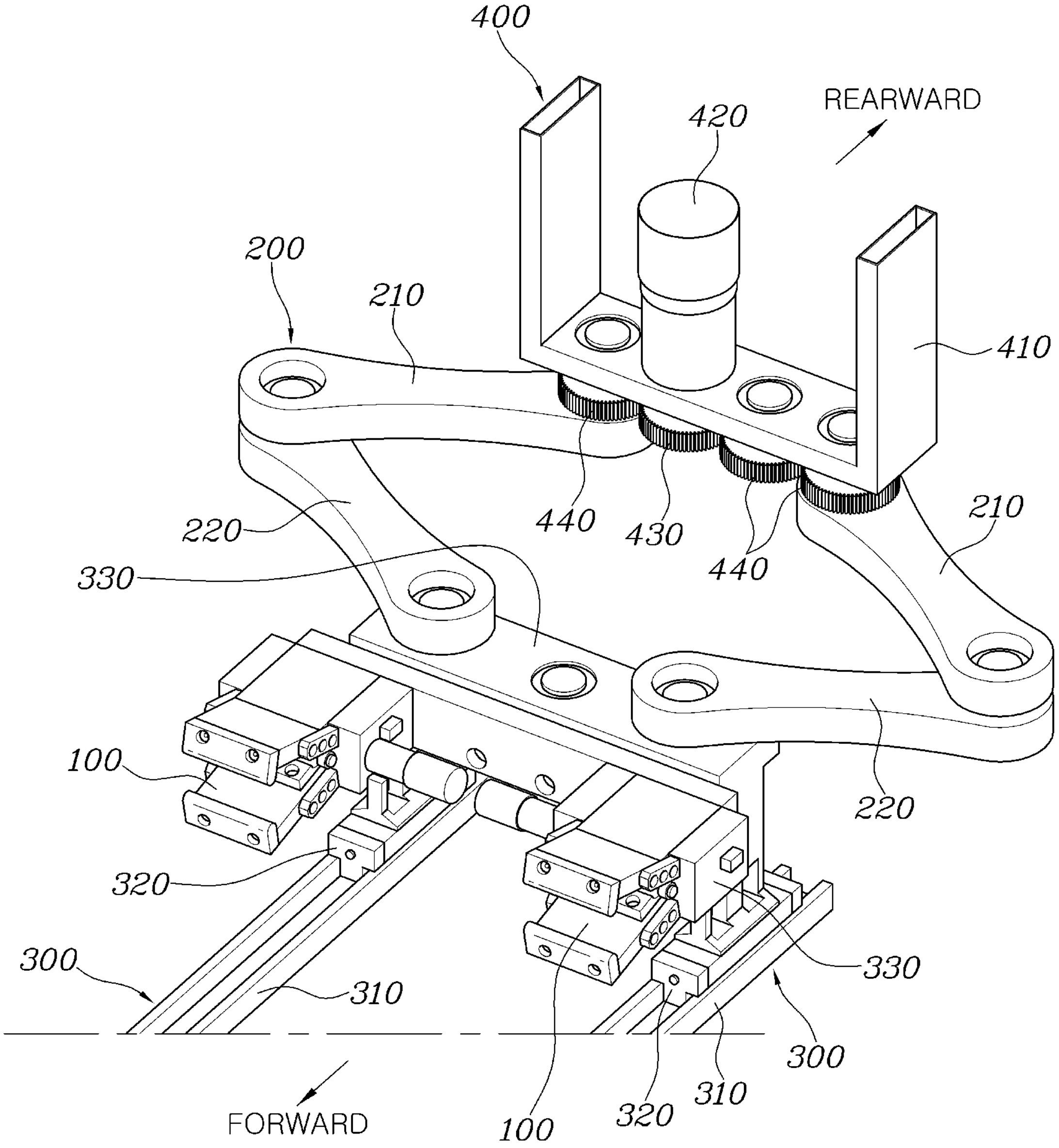
FIG. 2 is a view for explaining a link module, a guide module, and a power module according to an exemplary embodiment of the present disclosure.
Figure 3:
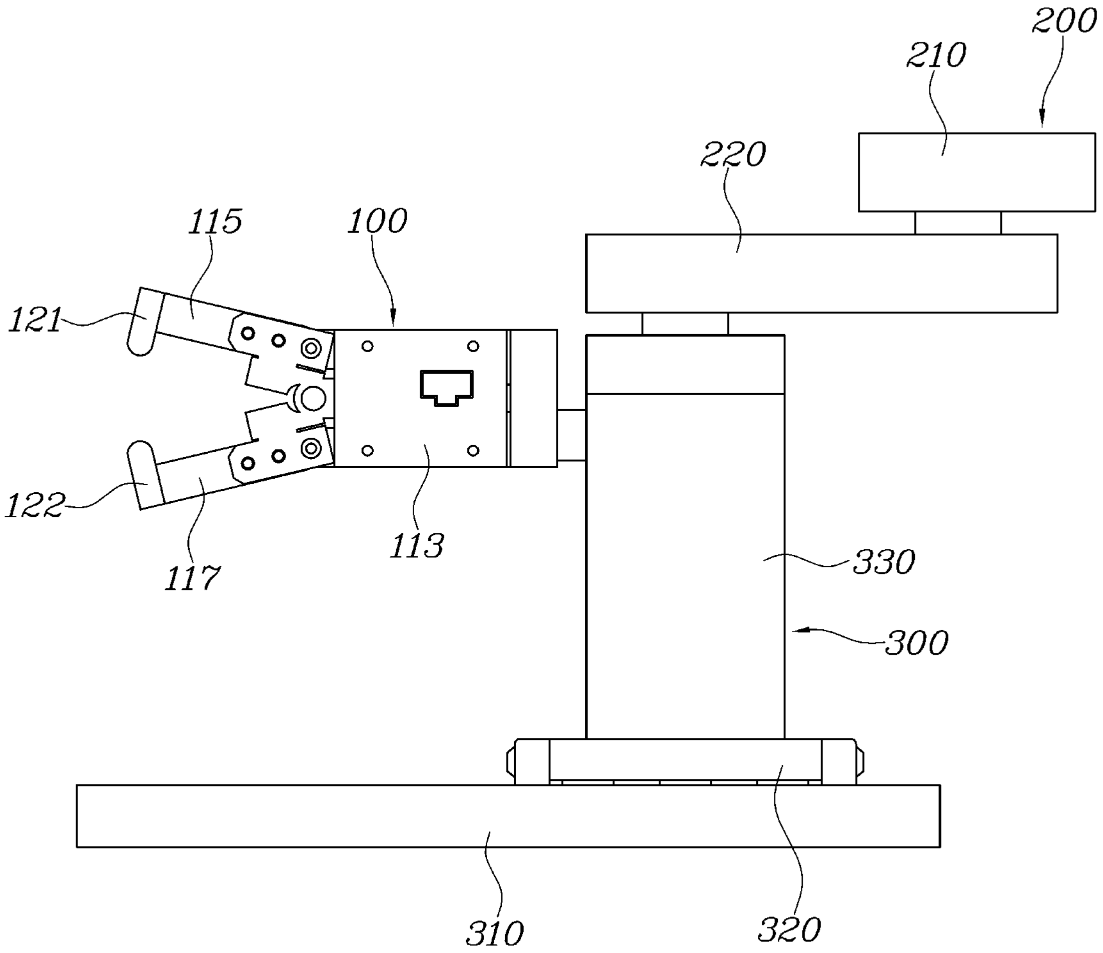
FIG. 3 is a side view of FIG. 2.
Figure 4:
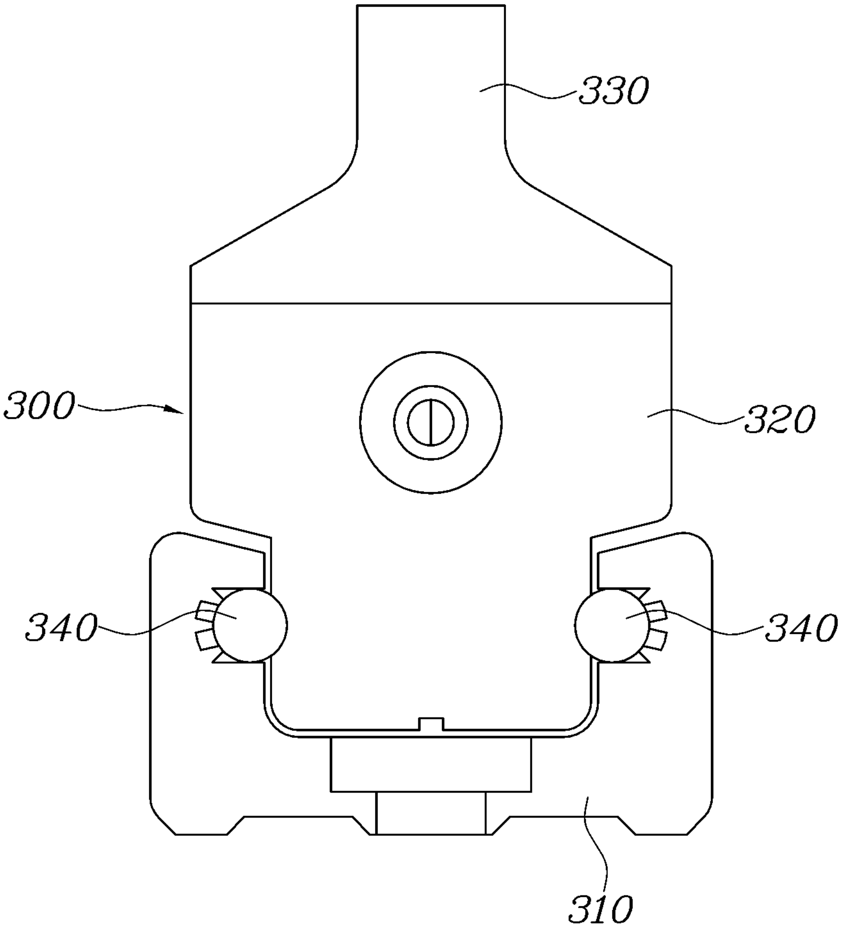
FIG. 4 is a view for explaining a guide shaft according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes “module”, “unit”, “part”, and “portion” used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification.

Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

When one constituent element is described as being “coupled” or “connected” to another constituent element, it should be understood that one constituent element can be coupled or directly connected to another constituent element, and an intervening constituent element can also be present between the constituent elements.

When one constituent element is referred to as being “directly coupled to” or “directly connected to” another constituent element, it should be understood that no intervening constituent element is present between the constituent elements.

Singular expressions include plural expressions unless clearly described as different meanings in the context.

In the present specification, it should be understood the terms “comprises,” “comprising,” “includes,” “including,” “containing,” “has,” “having” or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term “control unit” or “unit” included in the name of “motor control unit (MCU)” or “hybrid control unit (HCU)” is merely a term generally used to name a control device (controller or control unit) for controlling a vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a gripper apparatus for a vehicle according to an exemplary embodiment of the present disclosure will be described with reference to the accompanying drawings.

As illustrated in FIGS. 1 to 10, a gripper apparatus for a vehicle according to an exemplary embodiment of the present disclosure includes gripper modules 100 positioned in an internal space 20 of a vehicle in which an item 10 may be loaded, the gripper modules 100 being configured to fix the item 10 loaded into the internal space 20, and a link module 200 connected to the gripper modules 100 and configured to rectilinearly move the gripper modules 100 while rotating.

The item 10, which is loaded into the internal space 20 of the vehicle and gripped by the gripper modules 100, may be a frame which is made of steel and forms a wheelchair.

The vehicle, in which a wheelchair user may be seated, includes the internal space 20 which is comparatively large enough to accommodate the wheelchair. The wheelchair (item) loaded into the internal space 20 of the vehicle may be fixed by the gripper modules 100 according to an exemplary embodiment of the present disclosure.

The gripper apparatus according to an exemplary embodiment of the present disclosure may further include a guide module 300 provided to connect the gripper modules 100, the link module 200, and a vehicle body 30 and configured to guide the rectilinear movements of the gripper modules 100 when the link module 200 operates, and a power module 400 provided to connect the link module 200 and the vehicle body 30 and configured to generate power for rotating the link module 200.

The gripper module 100 according to an exemplary embodiment of the present disclosure may include upper and lower pawls 111 and 112 spaced from each other in an upward and downward direction, left and right side brackets 113 configured to couple the upper and lower pawls 111 and 112, an upper pawl extension portion 115 coupled to an end portion of the upper pawl 111 and configured to be rotatable upward or downward by an upper hinge 114, a lower pawl extension portion 117 coupled to an end portion of the lower pawl 112 and configured to be rotatable upward or downward by a lower hinge 116, a stationary magnet 118 fixed by the upper and lower pawls 111 and 112 and including an S-pole and an N-pole that are not changed in position, and a rotary magnet 119 including a rotatable structure at one side of the stationary magnet 118 and including an S-pole and an N-pole that vary in position when the rotary magnet 119 rotates.

The upper and lower pawls 111 and 112, the upper pawl extension portion 115, and the lower pawl extension portion 117 may each include a rectangular parallelepiped shape. The upper and lower pawls 111 and 112 may have the same size, and the upper and lower pawl extension portions 115 and 117 may also have the same size.

The upper pawl extension portion 115 may be coupled to be rotatable upward or downward by the upper hinge 114 to extend forward from the upper pawl 111. The lower pawl extension portion 117 may be coupled to be rotatable upward or downward by the lower hinge 116 to extend forward from the lower pawl 112.

The left and right side brackets 113 may be provided as two side brackets and coupled to respectively connect left and right surfaces of the upper and lower pawls 111 and 112.

The stationary magnet 118 may be a quadrangular magnet fixed in the gripper module 100 by the upper and lower pawls 111 and 112. One side and the other side of the stationary magnet 118, which bisect a cross-section of the quadrangular magnet, are the S-pole and the N-pole, respectively.

Figure 7:
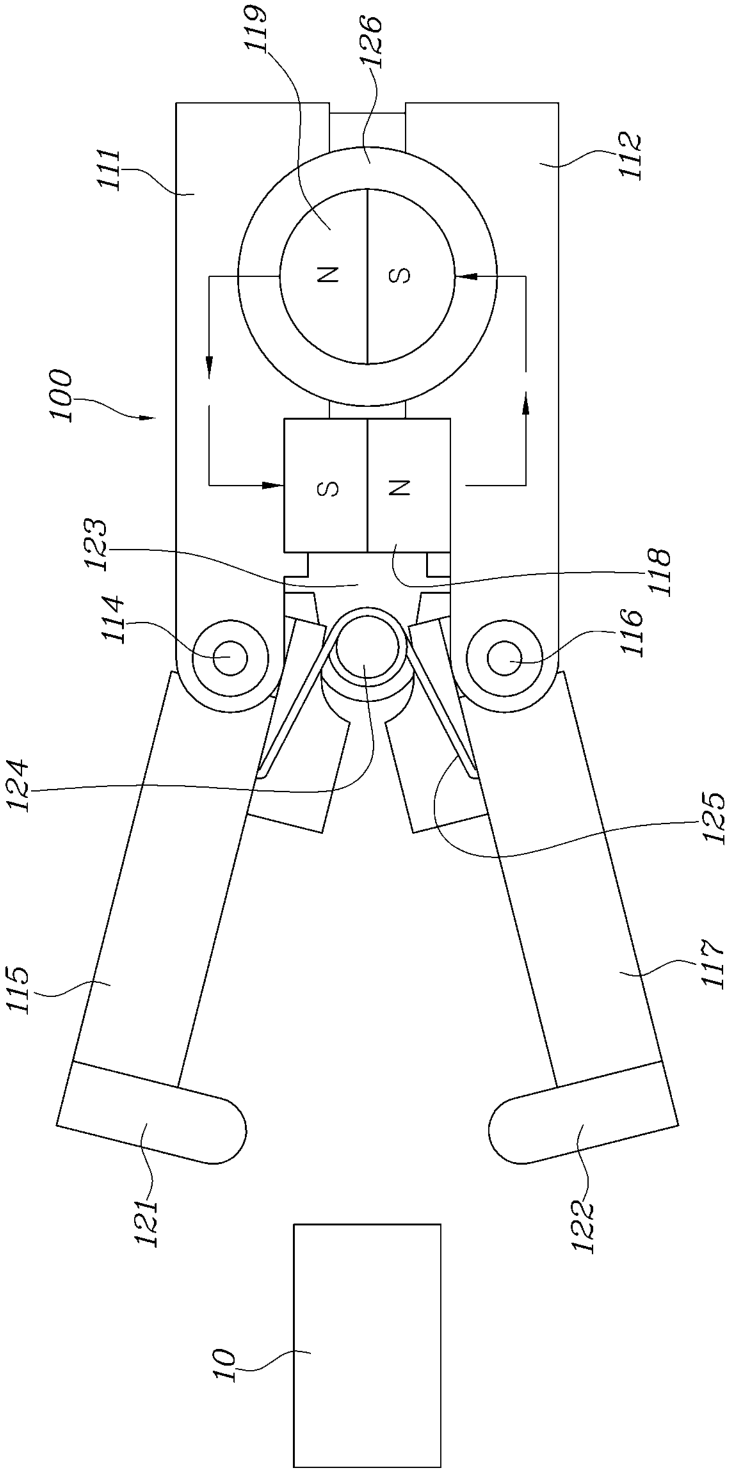
FIG. 7 is a side view of FIG. 5.

With reference to FIG. 7, the S-pole of the stationary magnet 118 is positioned above the N-pole and fixed by the upper pawl 111, and the N-pole of the stationary magnet 118 is positioned below the S-pole and fixed by the lower pawl 112.

In contrast, the S-pole of the stationary magnet 118 may be positioned below the N-pole and fixed by the lower pawl 112, and the N-pole may be positioned above the S-pole and fixed by the upper pawl 111.

The stationary magnet 118 is positioned and disposed forward of the rotary magnet 119. The stationary magnet 118 and the rotary magnet 119 may be provided to be spaced from each other at a minimum interval within a range in which the stationary magnet 118 and the rotary magnet 119 may transmit magnetic forces.

The rotary magnet 119 is spaced rearward from the stationary magnet 118 and configured as a circular magnet. One side and the other side of the rotary magnet 119, which bisect a cross-section of the circular magnet, are the S-pole and the N-pole, respectively.

The positions of the S-pole and the N-pole of the rotary magnet 119 may vary depending on the rotation of the rotary magnet 119.

Figure 9:
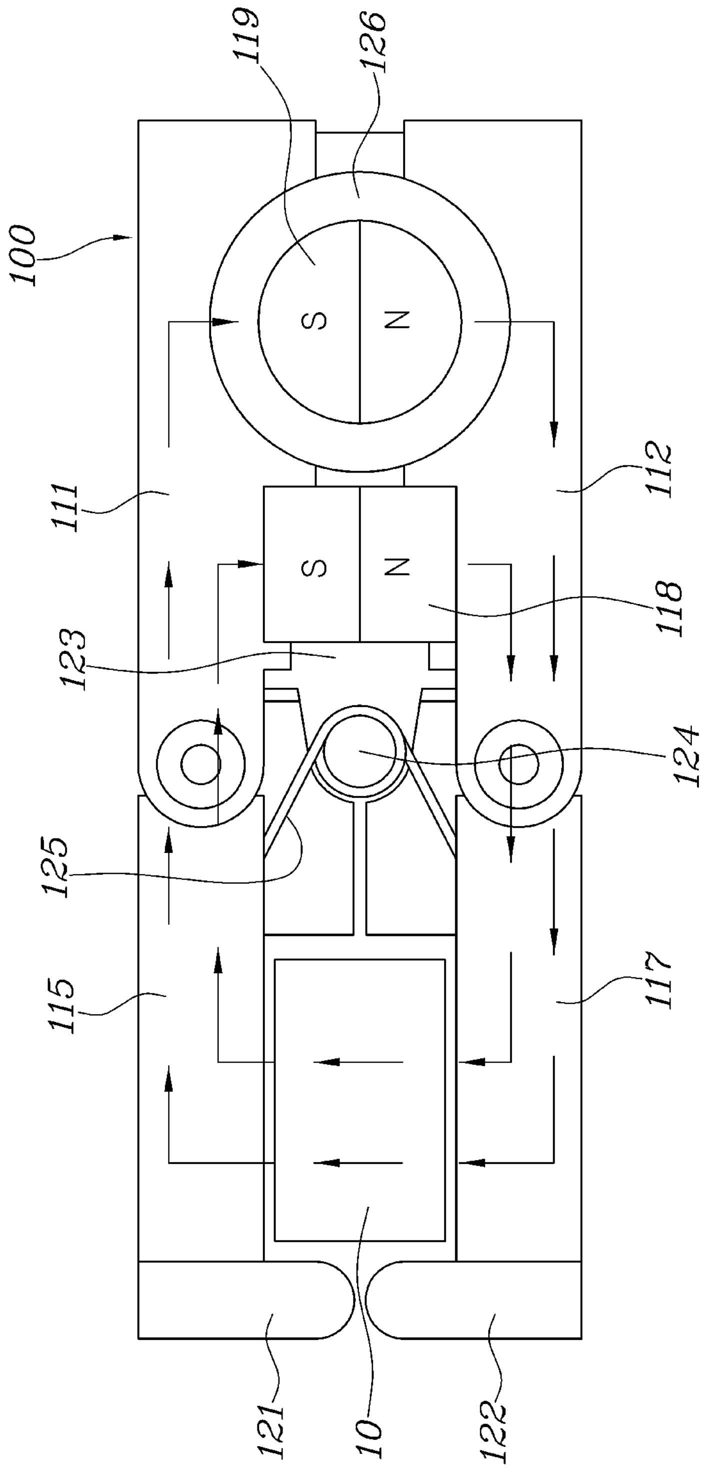
FIG. 9 is a side view of FIG. 8.

That is, with reference to FIG. 7, the S-pole of the rotary magnet 119 may be positioned above the N-pole, and the N-pole may be positioned below the S-pole. With reference to FIG. 9, the S-pole of the rotary magnet 119 may be positioned below the N-pole, and the N-pole may be positioned above the S-pole.

The gripper module 100 according to an exemplary embodiment of the present disclosure may further include an upper holder 121 coupled to an end portion of the upper pawl extension portion 115, and a lower holder 122 coupled to an end portion of the lower pawl extension portion 117.

The upper holder 121 may be coupled to the end portion of the upper pawl extension portion 115, and a lower end portion of the upper holder 121 may protrude downwardly from the upper pawl extension portion 115. The lower holder 122 is coupled to the end portion of the lower pawl extension portion 117, and a lower end portion of the lower holder 122 may protrude upwards from the lower pawl extension portion 117.

As illustrated in FIG. 9, when the upper pawl extension portion 115 and the lower pawl extension portion 117 are in a closed state, the upper holder 121 and the lower holder 122 is configured to prevent the withdrawal of the item 10 inserted into a space between the upper pawl extension portion 115 and the lower pawl extension portion 117.

According to an exemplary embodiment of the present disclosure, the upper pawl 111, the upper pawl extension portion 115, the lower pawl 112, and the lower pawl extension portion 117 may each be made of a magnetic material configured for transmitting the magnetic forces generated by the stationary magnet 118 and the rotary magnet 119. The magnetic material may be, but not limited to, steel.

Furthermore, the left and right side brackets 113, the upper holder 121, the lower holder 122, the upper hinge 114, the lower hinge 116, and a center hinge 124 to be described below may each be made of a non-magnetic material incapable of transmitting a magnetic force. The non-magnetic material may be, but not limited to, aluminum.

The upper pawl extension portion 115 may be spaced from the upper pawl 111 at a minimum interval by the upper hinge 114 so that the upper pawl extension portion 115 may rotate and transmit the magnetic forces generated by the stationary magnet 118 and the rotary magnet 119.

For example, the upper pawl extension portion 115 and the upper pawl 111 are spaced from each other at a minimum operating gap of 0.05 mm or less so that the upper pawl extension portion 115 and the upper pawl 111 may transmit the magnetic forces generated by the stationary magnet 118 and the rotary magnet 119 and minimize a loss of magnetic force.

Furthermore, the lower pawl extension portion 117 may also be spaced from the lower pawl 112 at a minimum interval by the lower hinge 116 so that the lower pawl extension portion 117 may rotate and transmit the magnetic forces generated by the stationary magnet 118 and the rotary magnet 119.

The lower pawl extension portion 117 and the lower pawl 112 are also spaced from each other at a minimum operating gap of 0.05 mm or less so that the lower pawl extension portion 117 and the lower pawl 112 may transmit the magnetic forces generated by the stationary magnet 118 and the rotary magnet 119 and minimize a loss of magnetic force.

The gripper module 100 according to an exemplary embodiment of the present disclosure may further include the center hinge 124 including two opposite end portions coupled to flanges 123 of the left and right side brackets 113, and hinge springs 125 provided on the center hinge 124 and including two opposite end portions supported on the upper pawl extension portion 115 and the lower pawl extension portion 117, the hinge springs 125 being configured to provide spring forces so that the upper pawl extension portion 115 and the lower pawl extension portion 117 rotate in opening directions (in directions in which the upper pawl extension portion 115 and the lower pawl extension portion 117 move away from each other).

The flanges 123, which protrude forward, may be provided on the left and right side brackets 113, and two opposite end portions of the center hinge 124 may be respectively fixed to the two flanges 123.

The hinge springs 125 may be provided as two hinge springs and provided at the two opposite end portions of the center hinge 124, one hinge spring for each of the two opposite end portions of the center hinge 124. The center hinge 124 may penetrate center portions of the hinge springs 125 wound circularly. The hinge springs 125 may be provided so that two opposite end portions of each of the hinge springs 125 may be supported on each of the upper and lower pawl extension portions 115 and 117.

In an exemplary embodiment of the present disclosure, the hinge spring 125 may be a single spring so that two opposite end portions of the hinge spring 125 may be supported on each of the upper and lower pawl extension portions 115 and 117.

An assembly, which is made by coupling the upper pawl 111, the upper pawl extension portion 115, and the upper holder 121, and an assembly, which is made by coupling the lower pawl 112, the lower pawl extension portion 117, and the lower holder 122, may be horizontally symmetric with respect to the center hinge 124. Therefore, the gripper module 100 may accurately grip the item 10.

The gripper module 100 according to an exemplary embodiment of the present disclosure may further include a gripper motor 127 fixed on the side bracket 113 and provided with a motor shaft 126 including an end portion to which the rotary magnet 119 is coupled.

The gripper motor 127 may be, but not limited to, a bidirectional motor configured for rotating clockwise and counterclockwise.

Figure 10:
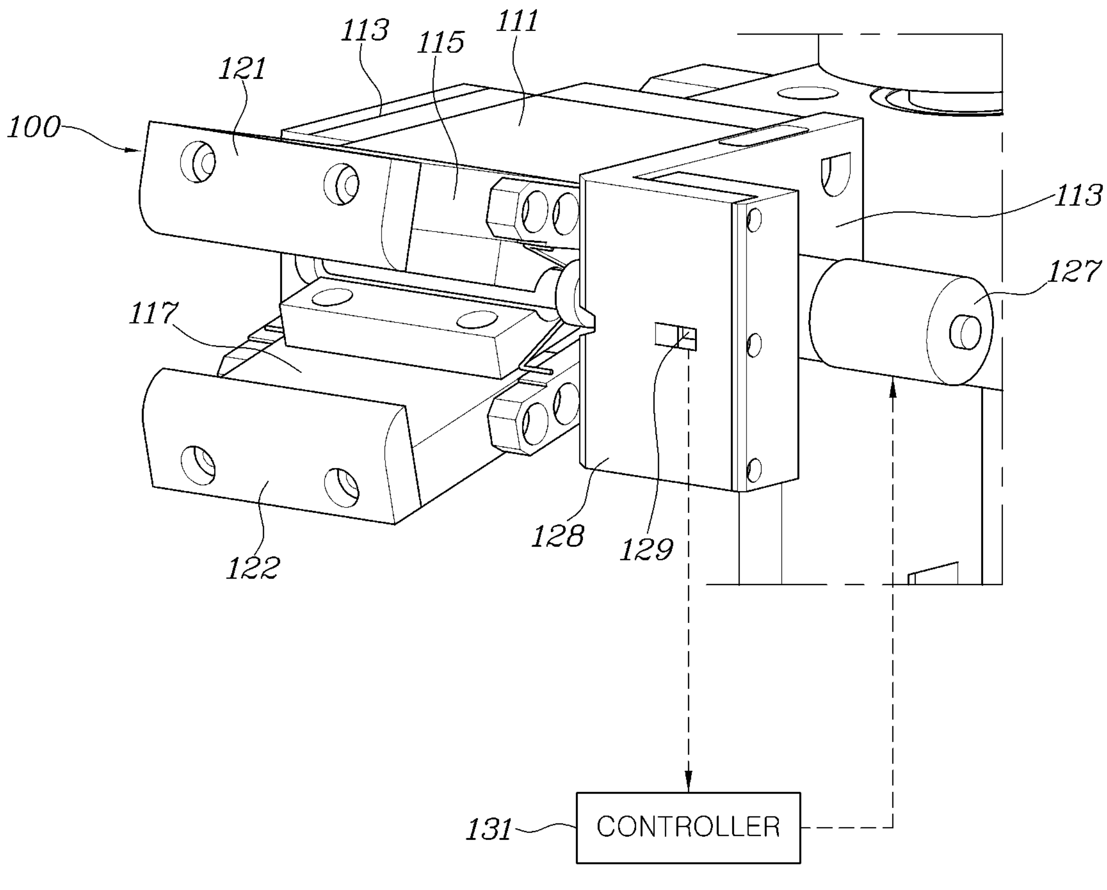
FIG. 10 is a view for explaining a proximity sensor and a controller according to an exemplary embodiment of the present disclosure.

With reference to FIG. 10, the gripper module 100 according to an exemplary embodiment of the present disclosure may further include a proximity sensor 129 fixed to a sensor bracket 128 connected to the side bracket 113, the proximity sensor 129 configured to detect the item 10 that approaches the gripper module 100, and a controller 131 configured to control an operation of the gripper motor 127 by use of a signal of the proximity sensor 129.

The sensor bracket 128 may be coupled to a front surface of the side bracket 113 and protrude from one side of the side bracket 113. The proximity sensor 129 coupled to the sensor bracket 128 may be positioned forward of the gripper motor 127.

The proximity sensor 129 may be provided on a block between the upper pawl extension portion 115 and the lower pawl extension portion 117 based on the opened state of the upper pawl extension portion 115 and the lower pawl extension portion 117. However, in the instant case, a time point at which the proximity sensor 129 detects the item 10 may be delayed.

In an exemplary embodiment of the present disclosure, when the proximity sensor 129 is provided outside the upper pawl extension portion 115 and the lower pawl extension portion 117 by use of the sensor bracket 128, the proximity sensor 129 may rapidly detect the item 10 that approaches the gripper module 100, which assists the gripper module 100 in more accurately operating.

An ultrasonic or infrared sensor for detecting the position of the item 10, which approaches the gripper module 100, may be used as the proximity sensor 129.

The controller 131 may be a printed circuit board (PCB) provided in the gripper module 110. As an exemplary embodiment of the present disclosure, the controller 131 may be separately provided outside the gripper module 100.

Figure 5:
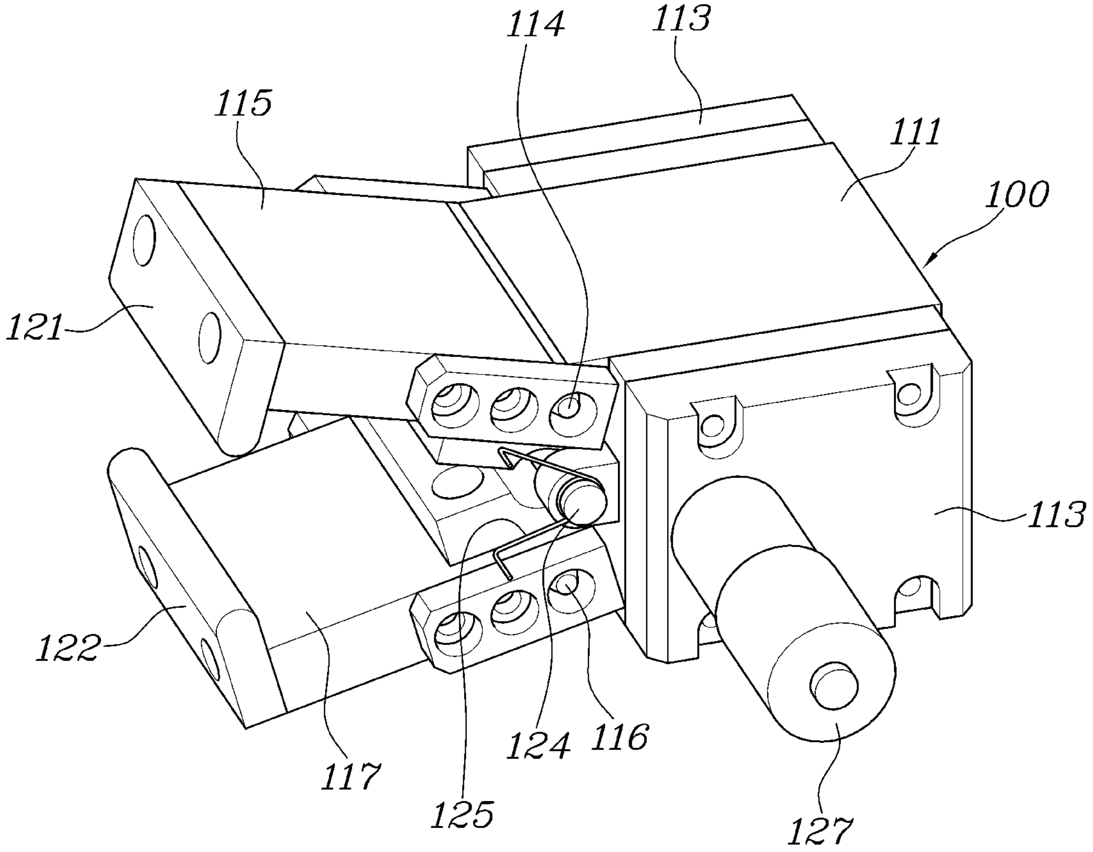
FIG. 5 is a view for explaining a state in which the gripper module according to an exemplary embodiment of the present disclosure is in a releasing state.
Figure 6:
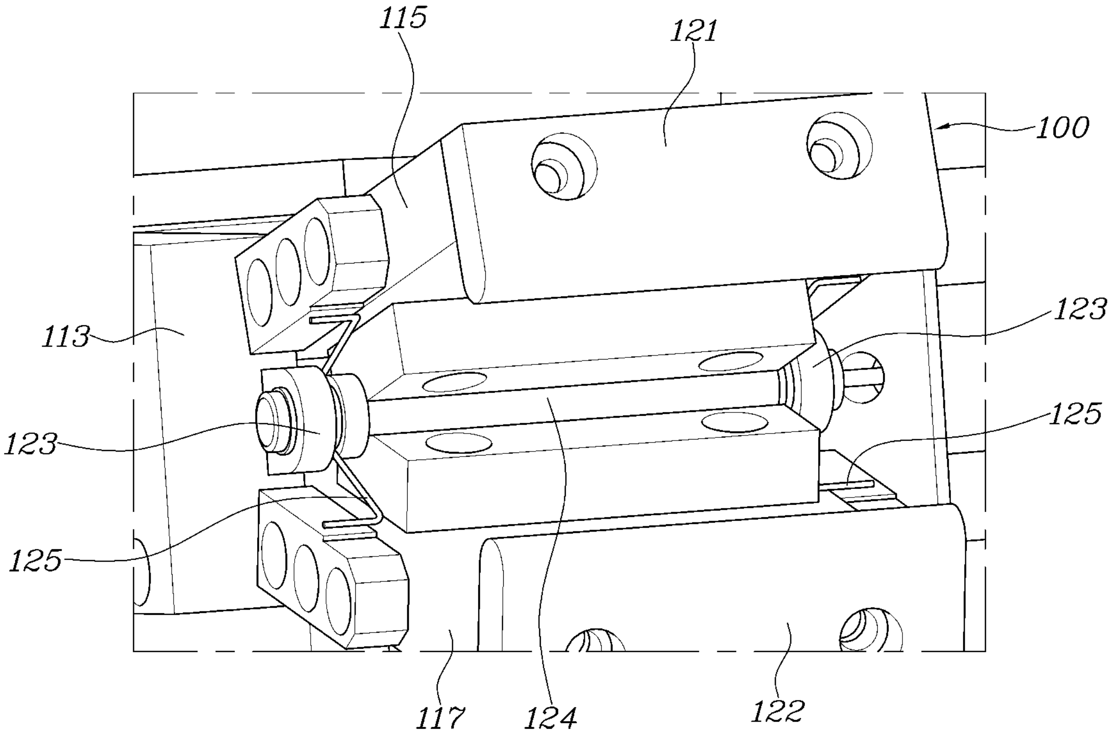
FIG. 6 is a view for explaining a center hinge and a hinge spring according to an exemplary embodiment of the present disclosure.

With reference to FIG. 5 and FIG. 7, when the gripper module 100 is in a releasing state, the item 10 is positioned outside the gripper module 100, the S-pole and the N-pole of the stationary magnet 118 respectively face the N-pole and the S-pole of the rotary magnet 119 so that a flow of magnetic force is formed only between the stationary magnet 118 and the rotary magnet 119, and the upper pawl extension portion 115 and the lower pawl extension portion 117 are moved outward away from each other by spring forces of the hinge springs 125 so that the gripper module 100 is maintained in the open state.

When the gripper module 100 is in the releasing state, the gripper motor 127 rotates by being controlled by the controller 131, the N-pole of the rotary magnet 119 faces the S-pole of the stationary magnet 118, and the S-pole of the rotary magnet 119 faces the N-pole of the stationary magnet 118 so that a flow of magnetic force is formed only between the stationary magnet 118 and the rotary magnet 119.

When the magnetic force is applied only between the stationary magnet 118 and the rotary magnet 119 as described above, the magnetic force is not transmitted to the upper pawl extension portion 115 and the lower pawl extension portion 117. Therefore, the upper pawl extension portion 115 and the lower pawl extension portion 117 are moved outward away from each other by the spring forces of the hinge springs 125 so that the gripper module 100 is maintained in the open state.

The item 10, which is gripped by the gripper module 100 according to an exemplary embodiment of the present disclosure, is configured by a magnetic material made of steel.

Figure 8:
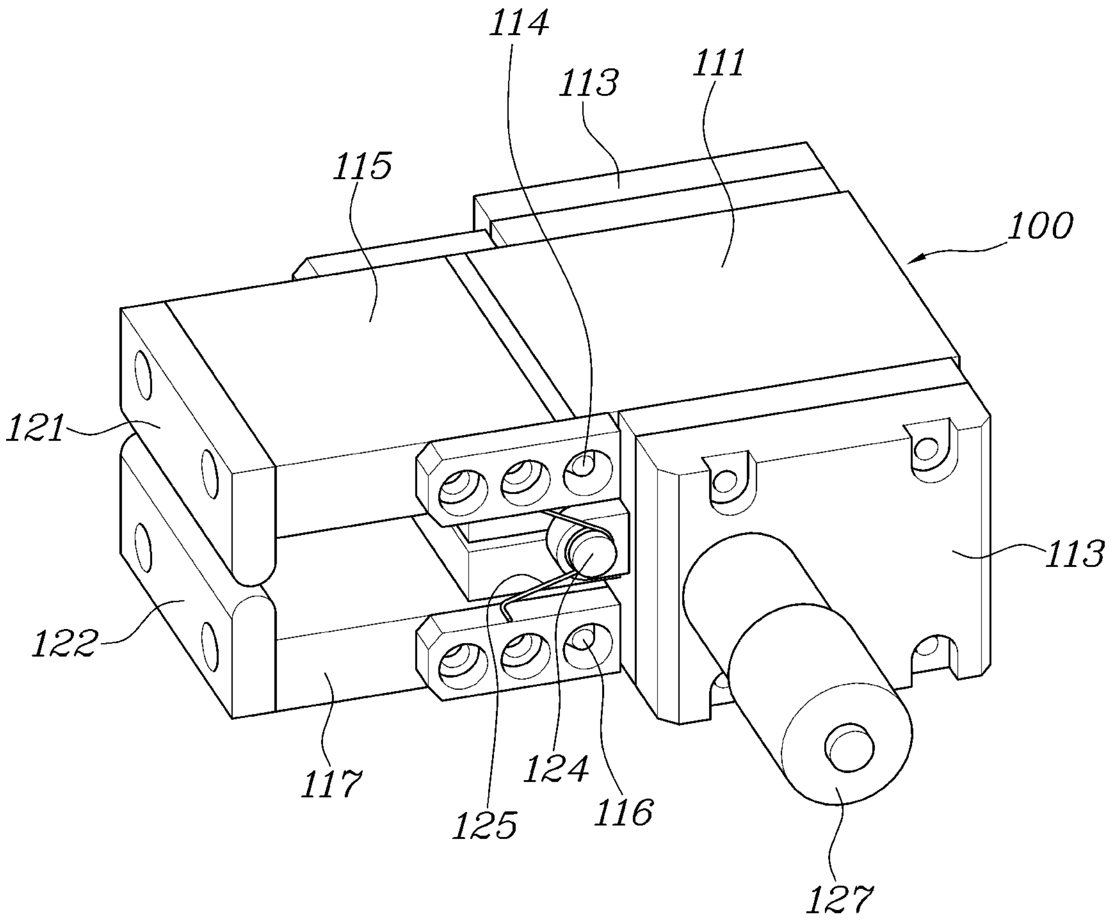
FIG. 8 is a view exemplarily illustrating a state in which the gripper module according to an exemplary embodiment of the present disclosure is in a gripping state.

Therefore, with reference to FIGS. 8 to 9, when the item 10 is introduced into the space between the upper pawl extension portion 115 and the lower pawl extension portion 117, the gripper motor 127 operates by being controlled by the controller 131 that receives the signal of the proximity sensor 129, and the rotary magnet 129 is rotated by operation of the gripper motor 127 so that the S-pole and the N-pole of the rotary magnet 129 respectively face the S-pole and the N-pole of the stationary magnet 128. In the instant case, the flow of magnetic force expands to a route that passes through the stationary magnet 128, the rotary magnet 129, the upper pawl extension portion 115, the lower pawl extension portion 117, and the item 10 so that the upper pawl extension portion 115 and the lower pawl extension portion 117 rotate in a direction in which the upper pawl extension portion 115 and the lower pawl extension portion 117 are closed, and thus the upper pawl extension portion 115 and the lower pawl extension portion 117 are in the closed state. When the upper pawl extension portion 115 and the lower pawl extension portion 117 are in the closed state, the gripper module 100 is closed and comes into the gripping state. When the gripper module 100 is in the gripping state, the item 10 is fixed by the closed upper and lower pawl extension portions 115 and 117 so that the upper holder 121 and the lower holder 122 may prevent the item 10 from being withdrawn to the outside thereof.

When the user (wheelchair user) manipulates a separate switch in the gripping state in which the item 10 is fixed by the gripper module 100, an operating signal of the switch is transmitted to the controller 131 so that the controller 131 operates the gripper motor 127, and the rotary magnet 119 is rotated by operation of the gripper motor 127. Therefore, as illustrated in FIG. 7, the N-pole of the rotary magnet 119 faces the S-pole of the stationary magnet 118, and the S-pole of the rotary magnet 119 faces the N-pole of the stationary magnet 118. In the instant case, the flow of magnetic force is formed only between the stationary magnet 118 and the rotary magnet 119. Therefore, the upper pawl extension portion 115 and the lower pawl extension portion 117 are moved outward away from each other by the spring forces of the hinge springs 125 so that the upper pawl extension portion 115 and the lower pawl extension portion 117 are in the open state, and as a result, the gripper module 100 may switch to the releasing state in which the gripper module 100 does not fix the item 10.

With reference to FIG. 1, FIG. 2, FIG. 3, and FIG. 4, the guide module 300 according to an exemplary embodiment of the present disclosure may include stationary rails 310 provided in the internal space 20 of the vehicle into which the item 10 is loaded, the stationary rails 310 being fixed to a bottom portion of the vehicle body 30 and extending forward and rearward thereof, movable rails 320 coupled to the stationary rails 310 and configured to move along the stationary rails 310, and a guide bar 330 coupled to the movable rails 320 and connected to the gripper modules 100 and the link module 200.

There are two assemblies each including the stationary rail 310 and the movable rail 320. The two assemblies may be provided on the bottom surface of the vehicle body 30 that defines the internal space 20 of the vehicle, and the two assemblies may be spaced from each other leftward and rightward and extend forward and rearward thereof.

Two opposite end portions of the guide bar 330 may be coupled to the two movable rails 320 and configured to connect the two movable rails 320 spaced from each other leftward and rightward.

The guide module 300 according to an exemplary embodiment of the present disclosure may further include guide shafts 340 provided between the stationary rail 310 and the movable rail 320 and configured to support the movement of the movable rail 320 and minimize a clearance between the stationary rail 310 and the movable rail 320.

The guide shafts 340 are provided as two guide shafts. The guide shafts 340 may be provided one by one between left and right sides of the stationary rail 310 and left and right sides of the movable rail 320 that face the left and right sides of the stationary rail 310.

The guide shafts 340 are provided to extend forward and rearward so that the movable rail 320 moves forward or rearward based on the guide shafts 340.

The guide shaft 340 may minimize tolerance and clearance related to rectilinear forward/rearward movements of the gripper module 100. The guide shaft 340 may also be configured to reinforce strength and rigidity and cope with a predetermined portion of an external impact.

The power module 400 according to an exemplary embodiment of the present disclosure may include a base bracket 410 provided in the internal space 20 of the vehicle into which the item 10 is loaded, the base bracket 410 being fixed to the vehicle body 30, a drive motor 420 fixed to the base bracket 410, a driving gear 430 connected to the drive motor 420 and rotatably coupled to the base bracket 410, and a plurality of driven gears 440 configured to connect the driving gear 430 and the link module 200 and configured to transmit a rotation force.

The base bracket 410 may be fixed on the vehicle body 30 and provided above a rear sides of the guide module 300.

The drive motor 420 is fixed on the base bracket 410, and the driving gear 430 and the driven gears 440 are rotatably coupled to the base bracket 410.

The drive motor 420 may be, but not limited to, a bidirectional motor configured for rotating clockwise and counterclockwise.

Power of the drive motor 420 is transmitted to the link module 200 through the driving gear 430 and the plurality of driven gears 440.

The driving gear 430 is directly connected to the drive motor 420, and the driven gears 440 are sequentially connected to left and right sides of the driving gear 430 so that the rotation force is transmitted.

The link module 200 according to an exemplary embodiment of the present disclosure may include first links 210 each including one end portion coupled to the driven gear 440, and second links 220 each including one end portion rotatably coupled to the guide bar 330. An end portion of the first link 210 and an end portion of the second link 220 are rotatably coupled to each other.

The first links 210 may be provided as two first links, the second links 220 may be provided as two second links, and the two first links and the two second links may be provided to be vertically symmetric.

When the rotation force of the drive motor 420 is simultaneously transmitted to the two first links 210 through the driving gear 430 and the driven gears 440, any one of the two first links 210 rotates clockwise, the other first link rotates counterclockwise so that the end portions of the two first links 210 connected to the second links 220 rotate in a direction in which the end portions of the two first links 210 moves toward or away from each other.

Therefore, when the first and second links 210 and 220 are rotated by operation of the drive motor 420, the guide bar 330 and the gripper modules 100 may rectilinearly move in the direction toward the base bracket 410 (the rearward direction) and the opposite direction (the forward direction) as the movable rails 320 move along the stationary rails 310.

According to the gripper apparatus for a vehicle according to an exemplary embodiment of the present disclosure described above, the item 10 loaded into the internal space 20 of the vehicle may be fixed by the fixing structure of the gripper module 100 using the magnetic forces generated by the stationary magnet 118 and the rotary magnet 119. Therefore, the wheelchair user may fix the wheelchair without the assistance of another person, the user may conveniently use the gripper apparatus, the fixing force for fixing the item 10 may be increased by the magnetic force, and the safety may be further improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A gripper apparatus for a vehicle, the gripper apparatus comprising:

a gripper module positionable in an internal space of the vehicle into which an item is loaded, the gripper module being configured to fix the item loaded into the internal space; and a link module connected to the gripper module and configured to rectilinearly move the gripper module while rotating, wherein the gripper module includes:

upper and lower pawls spaced from each other in an upward and downward direction;

left and right side brackets coupling the upper and lower pawls;

an upper pawl extension portion pivotally coupled to an end portion of the upper pawl by an upper hinge and configured to be rotatable upward or downward;

a lower pawl extension portion pivotally coupled to an end portion of the lower pawl by a lower hinge and configured to be rotatable upward or downward;

a stationary magnet fixed by the upper and lower pawls and including an S-pole and an N-pole that are not changed in position; and a rotary magnet rotatably mounted at one side of the stationary magnet and including an S-pole and an N-pole that vary in position in response to the rotary magnet rotating.

2. The gripper apparatus of claim 1, wherein the item, which is loaded into the internal space of the vehicle and gripped by the gripper module, is a frame which is made of magnetic material and forms a wheelchair.

3. The gripper apparatus of claim 1, further including:

a guide module provided to connect the gripper module, the link module, and a vehicle body and configured to guide rectilinear movement of the gripper module in response to the link module operating.

4. The gripper apparatus of claim 3, wherein the guide module includes:

a stationary rail provided in the internal space into which the item is loaded, the stationary rail being fixed to a bottom portion of the vehicle body and extending forward and rearward thereof;

a movable rail coupled to the stationary rail and configured to move along the stationary rail; and a guide bar coupled to the movable rail and connected to the gripper module and the link module.

5. The gripper apparatus of claim 4, wherein the guide module further includes a guide shaft provided between the stationary rail and the movable rail and configured to support a movement of the movable rail and minimize a clearance between the stationary rail and the movable rail.

6. The gripper apparatus of claim 4, wherein the power module includes:

a base bracket fixable to the vehicle body in the internal space into which the item is loaded;

a drive motor fixed to the base bracket;

a driving gear connected to the drive motor and rotatably coupled to the base bracket; and a plurality of driven gears engaged to the driving gear and the link module and configured to transmit a rotation force.

7. The gripper apparatus of claim 6, wherein the link module includes:

first links each including a first end portion coupled to the driven gears; and second links each including one end portion rotatably coupled to the guide bar, wherein a second end portion of the first links and an end portion of the second links are rotatably coupled to each other.

8. The gripper apparatus of claim 7, wherein the first links are provided as two first links, the second links are provided as two second links, and the two first links and the two second links are provided to be vertically symmetric, and wherein in response to the first and second links being rotated by operation of the drive motor, the guide bar and the gripper module rectilinearly move in a direction toward the base bracket and the opposite direction as the movable rail moves along the stationary rail.

9. The gripper apparatus of claim 1, further including:

a power module connecting the link module and a vehicle body and configured to generate power for rotating the link module.

10. The gripper apparatus of claim 1, wherein the gripper module further includes:

an upper holder coupled to an end portion of the upper pawl extension portion; and a lower holder coupled to an end portion of the lower pawl extension portion, and wherein the upper and lower holders prevent withdrawal of the item inserted into a space formed between the upper pawl extension portion and the lower pawl extension portion in response to the upper pawl extension portion and the lower pawl extension portion being in a closed state.

11. The gripper apparatus of claim 10, wherein the gripper module further includes a gripper motor fixed on one of the left and right side brackets and provided with a motor shaft including an end portion to which the rotary magnet is coupled.

12. The gripper apparatus of claim 11, wherein the gripper module further includes:

a proximity sensor fixed to a sensor bracket connected to one of the left and right side brackets, the proximity sensor being configured to detect the item that approaches the gripper module; and a controller operatively connected to the proximity sensor and configured to control an operation of the gripper motor by use of a signal of the proximity sensor.

13. The gripper apparatus of claim 12, wherein the item gripped by the gripper module is configured by a magnetic material made of steel, and wherein in response to the item being introduced into the space between the upper pawl extension portion and the lower pawl extension portion, the gripper motor operates by being controlled by the controller that receives a signal of the proximity sensor, the S-pole and the N-pole of the stationary magnet, respectively face the S-pole and the N-pole of the rotary magnet by operation of the gripper motor, and a flow of magnetic force expands to a route that passes through the stationary magnet, the rotary magnet, the upper pawl extension portion, the lower pawl extension portion, and the item so that the upper pawl extension portion and the lower pawl extension portion rotate in a direction in which the upper pawl extension portion and the lower pawl extension portion are closed so that the upper pawl extension portion and the lower pawl extension portion are in a closed state so that in response to that the upper pawl extension portion and the lower pawl extension portion being in the closed state, the gripper module is in a gripping state, and the item is fixed by the closed upper and lower pawl extension portions in response that the gripper module is in the gripping state so that the upper and lower holders prevent the item from being withdrawn to the outside thereof.

14. The gripper apparatus of claim 10, wherein the upper pawl, the upper pawl extension portion, the lower pawl, and the lower pawl extension portion are each made of a magnetic material configured for transmitting magnetic forces generated by the stationary magnet and the rotary magnet, and the left and right side brackets, the upper holder, the lower holder, the upper hinge, the lower hinge, a center hinge are each made of a non-magnetic material incapable of transmitting a magnetic force.

15. The gripper apparatus of claim 14, wherein the center hinge includes first and second opposite end portions coupled to flanges of the left and right side brackets.

16. The gripper apparatus of claim 1, wherein the gripper module further includes:

a center hinge including first and second opposite end portions coupled to flanges of the left and right side brackets; and at least a hinge spring mounted on the center hinge and including first and second opposite end portions supported on the upper pawl extension portion and the lower pawl extension portion, the at least a hinge spring being configured to provide spring forces to the upper pawl extension portion and the lower pawl extension portion so that the upper pawl extension portion and the lower pawl extension portion rotate in opening directions.

17. The gripper apparatus of claim 16, wherein in response to the gripper module being in a releasing state, the item is positioned outside the gripper module, while the S-pole and the N-pole of the stationary magnet, respectively face the N-pole and the S-pole of the rotary magnet so that a flow of magnetic force is formed only between the stationary magnet and the rotary magnet, and the upper pawl extension portion and the lower pawl extension portion are moved outward away from each other by spring forces of the at least a hinge spring so that the gripper module is maintained in an open state.

18. A gripper apparatus for a vehicle, the gripper apparatus comprising:

a gripper module positionable in an internal space of the vehicle into which an item is loaded, the gripper module being configured to fix the item loaded into the internal space;

a link module connected to the gripper module and configured to rectilinearly move the gripper module while rotating; and a power module connecting the link module and a vehicle body and configured to generate power for rotating the link module, wherein the power module includes:

a base bracket fixable to the vehicle body in the internal space into which the item is loaded;

a drive motor fixed to the base bracket;

a driving gear connected to the drive motor and rotatably coupled to the base bracket; and a plurality of driven gears engaged to the driving gear and the link module and configured to transmit a rotation force.

* * * * *